Figure 1:
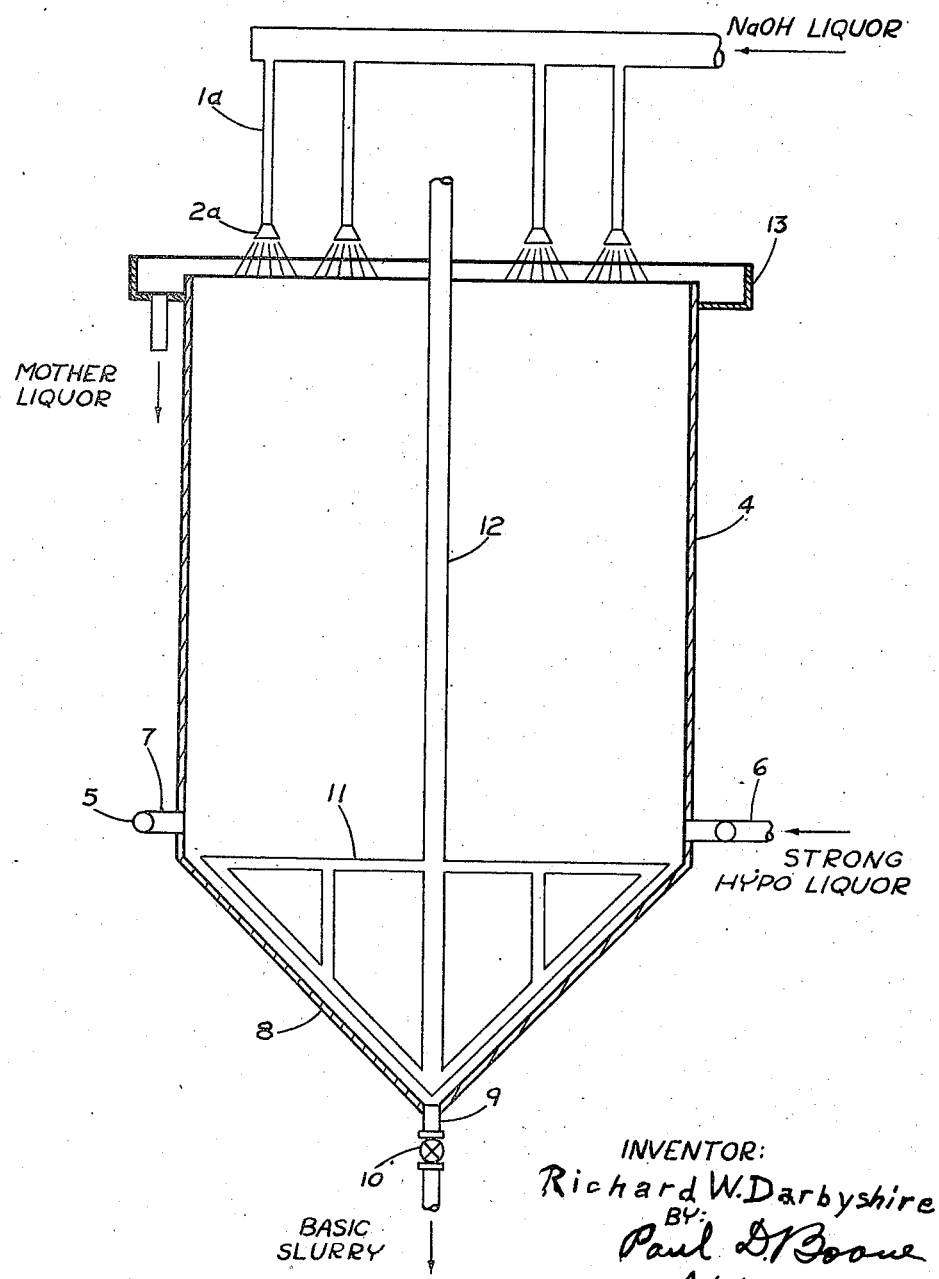

Feb. 24, 1948.   R. W. DARBYSHIRE   2,436,745
PRECIPITATION OF BASIC CALCIUM HYPOCHLORITE
Filed May 8, 1944   3 Sheets-Sheet 1

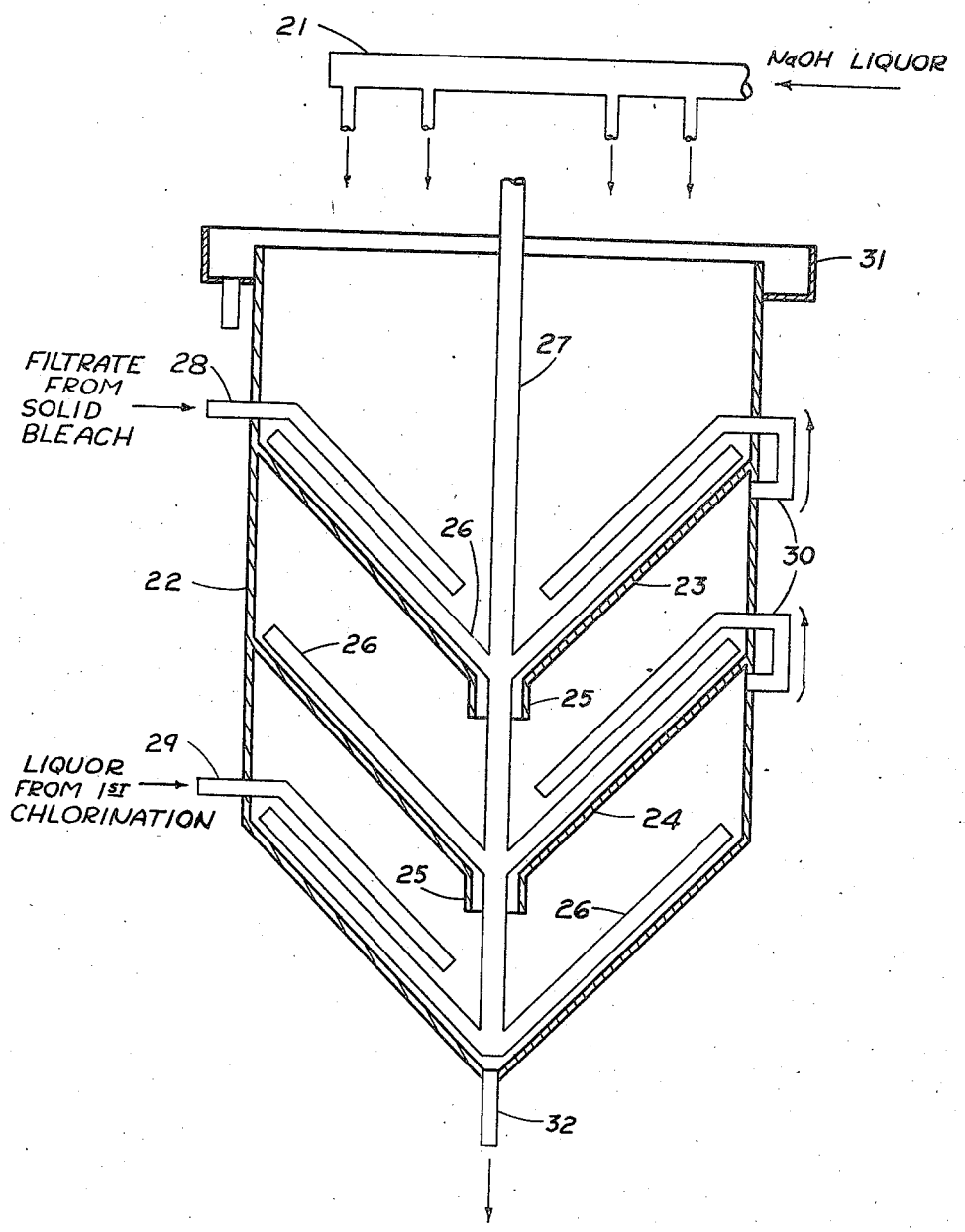

Patented Feb. 24, 1948

2,436,745

UNITED STATES PATENT OFFICE 2,436,745

PRECIPITATION OF BASIC CALCIUM HYPOCHLORITE

Richard W. Darbyshire, Trenton, Mich., assignor to Wyandotte Chemicals Corporation, Wyandotte, Mich., a corporation of Michigan Application May 8, 1944, Serial No. 534,627

5 Claims. (Cl. 23—86)

1

This invention relates to the manufacture of high test bleach. This invention is an improvement over the process disclosed in the Mericola et al. Patent #2,320,635 of June 1, 1943. That patent was an improvement over prior methods in that chlorination was effected in a saturated solution of the normal calcium hypochlorite in the mother liquor containing the suspended basic calcium hypochlorite. Such suspension was achieved by providing a solution of calcium chloride saturated with respect to normal calcium hypochlorite, separating a portion only of such solution and precipitating basic calcium hypochlorite from said portion; this precipitate was filtered, then the remaining portion of the saturated normal calcium hypochlorite solution was mixed with this precipitate, after which the resultant slurry was chlorinated to produce a precipitated normal calcium hypochlorite.

The present invention constitutes an efficient and economical improvement on such latter method. The filtration of hypochlorite solution requires expensive equipment and considerable labor in the operation thereof. Also it is necessary to use a strong calcium hypochlorite liquor on the filter, if all the weak liquor is to be displaced from the filter cake.

I have found that I can eliminate the separate filtration step. And by my method the same end is achieved but much more cheaply, not only from the standpoint of the cost of equipment, but in the operation because labor is saved.

By the method in accordance with this invention, the strong calcium hypochlorite and calcium chloride liquor is treated with caustic soda liquor of greater density, and the resulting precipitate of basic calcium hypochlorite as it settles downwardly is washed countercurrent by fresh, strong, calcium hypochlorite liquor, preferably saturated, which it encounters at a lower level in the reactor. The ascending liquor saturated with respect to calcium hypochlorite and calcium chloride washes the mother liquor away from the solids and a part of this same type liquor moves or is pushed downwardly with the solids, i. e., the precipitate, carrying said solids out of the lower end of the reactor as a slurry of basic hypochlorite in a concentrated normal hypochlorite solution. The solid basic calcium hypochlorite taken off in the slurry is essentially dibasic calcium hypochlorite. The mother liquor which is displaced is composed of a solution of sodium chloride, unreacted calcium chloride with unreacted calcium hypochlorite. There are several ways in which this is effected, but each is characterized by formation of solid basic calcium hypochlorite by the reaction between caustic soda and a strong, preferably saturated, solution of calcium hypochlorite containing calcium chloride, and washing the said descending solids with ascending concentrated, preferably saturated solution, of calcium hypochlorite. By each mode the said solids are entrained as they move or settle downwardly in a descending menstrum of concentrated or saturated solution of normal calcium hypochlorite, forming a slurry. This slurry as in the Mericola et al. Patent #2,320,635 is sent to the chlorinating tower designated there as numeral 8.

Several different types of apparatus may be used to carry out my invention. These are illustrated in the accompanying drawings in which—

Fig. 1 is a side elevation of a reactor having a cone bottom with the hypochlorite solution inlets slightly above the rakes and wherein the caustic inlet pipes are above the level of the liquid.

Figure 2:
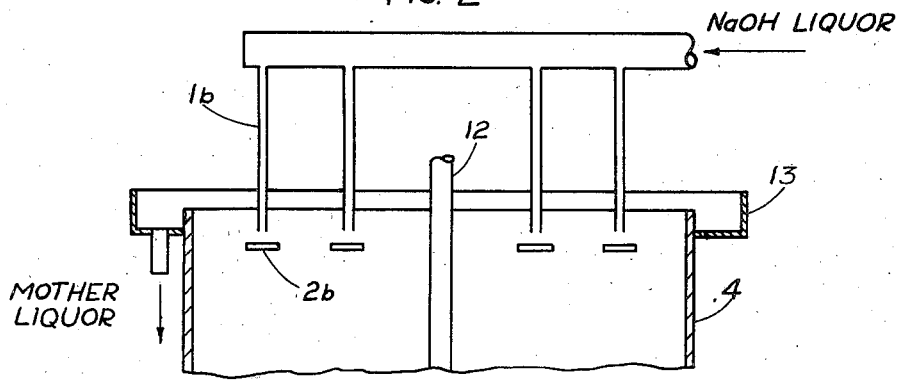
Figure 3:
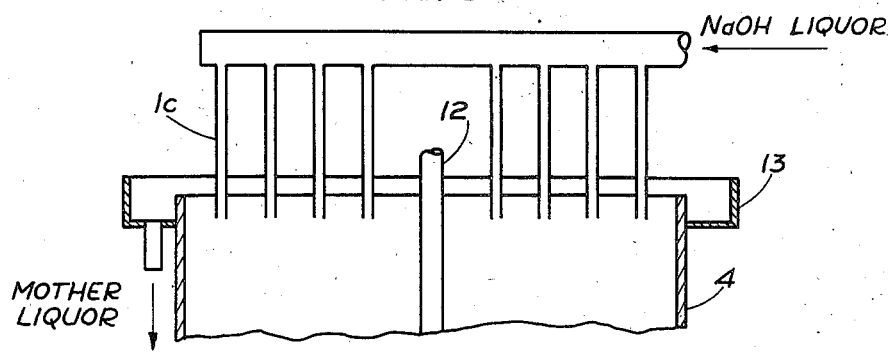
Figure 4:
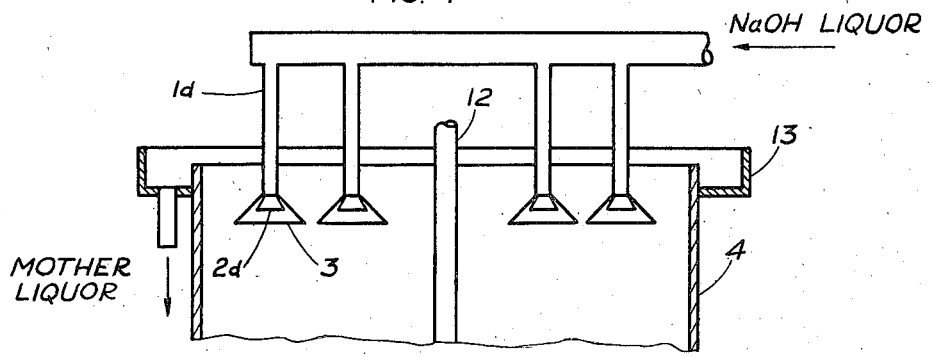

Figs. 2, 3 and 4 respectively, are side elevations of the upper portion of the same reactor shown in Fig. 1 except that the introductory pipes for the caustic soda solution extend in each case below the upper level.

Fig. 5 is a side elevation of another reactor provided with two sloping trays with rakes, and having two inlets for the hypochlorite solution at different levels.

In Figs. 1, 2, 3 and 4 of these drawings, which constitute the preferred forms of mechanical apparatus for carrying out my invention, $1^a$, $1^b$, $1^c$ and $1^d$ indicate vertically disposed caustic soda inlet pipes for said respective figures. Pipes $1^a$ terminate above the upper level of the surface of the liquid, said pipes having a spray nozzle $2^a$ to give a coarse dispersion of the caustic liquor. Pipes $1^b$ extend below the surface of the liquid in the tank 4, said pipes $1^b$ having a deflector plate $2^b$ just below the upper surface level to scatter a stream of caustic liquor likewise as a coarse dispersion. Pipes $1^c$ which are numerous and of small diameter extend below the upper surface level, to give small diameter streams. Pipes $1^d$ likewise extend below the surface of the liquid, said pipes having a spray nozzle $2^d$ and a gas chamber 3 for the formation of the spray. The tank 4 is provided at its upper end with an overflow launder 13. Near the base of the tank, but above the cone section, a circumferential pipe 5 is hooked up to the inlet pipe 6 carrying the strong hypochlorite solution. Pipes 7 inject this liquor into the tank. The cone section 8 of the tank 4 is provided with an outlet pipe 9 which has a valve 10 therein for regulating the outlet flow. Within the cone area there are thickener rakes 11 attached to a shaft 12.

In Fig. 5 of the drawing pipe 21 carrying the caustic soda solution may be provided with any of the distributing means indicated previously. Tank 22 is equipped with two conical trays 23 and 24 spaced equally. These trays have central down pipes 25. The bottom of the tank is conical, as in Fig. 1. Rakes 26 are turned by shaft 27. Pipe 29 near the bottom of tank 22 introduces bleach liquor from the first chlorination to the center of the lower section of the reactor. Pipe 28 positioned above the upper tray introduces filtrate from the solid bleach to the region above the center of the cone. Pipe 30 carries the clear liquor from the top of each section into the bottom of the next higher section.

It will be understood that the number of trays is simply optional and that this process has simply been described on an apparatus having two trays. Instead of having two trays as shown in Fig. 5, trays can be dispensed with by employing a tall reactor.

The following is an example of an operation carried out in the apparatus described in Fig. 1. The strong hypochlorite solution having a density of between 1.23 and 1.30, and which is composed of 1 part of filtrate from the solid bleach from the second chlorinating tower and 2 parts of bleach liquor from the initial chlorinating tower, is introduced through pipes 7 into the lower section of the reactor 4. The point of introduction is a short distance above the top of the rakes. This liquor is uniformly distributed around the periphery of the tank. A 50% caustic solution (density 1.52) is introduced through spray nozzles 2ª in the ratio of 1 part to 12 parts of the strong hypochlorite solution. The coarse spray of caustic descends several inches below the surface of the liquid before any appreciable amount of solid basic calcium hypochlorite is formed. Because of the density of said solids they settle downwardly through the upwardly flowing liquor. During this settling operation said solids are washed free of the mother liquor resulting from the reaction. The said falling solids with some of the strong hypochlorite solution which moves downwardly enter the cone section of the reactor as a slurry. The thickener rakes drag these said solids toward the center gradually, where they are discharged through valve 10 in pipe 9. The mother liquor resulting from the reaction flows upwardly and over the upper tank edge into the launder 13 where it is removed.

It is important to secure a coarse dispersion of caustic solution because a fine dispersion would give small particle size which is slow settling. On the other hand a too coarse dispersion gives droplets which do not react completely before reaching the bottom portion. The agitation by the rakes should be mild, i. e., merely enough to concentrate the solids but not unduly crush their structure. It might be pointed out that somewhat more of the strong hypochlorite solution flows up than down. Due to the heavier density of the strong hypochlorite solution than of the liquor at the top from which said solids have been precipitated, there will be gradations of decreasing densities from bottom to top. This decrease in density can also be used as a means of indicating the extent of the reaction for quick control tests.

The following is an example of an operation carried out in the apparatus described in Fig. 5.

Liquor from the initial chlorination is introduced through pipe 29 to a point near the center of the lower section of the reactor and just below down-pipe 25. This liquor mixes with the slurry descending from the tray above. Clear liquor rises into the narrowing section and is conducted by pipe 30 into the center of middle section and likewise just below down-pipe 25. Clear liquor from this section rises in the same manner and is likewise conducted by pipe 30 into the center of the upper section. Filtrate from the solid bleach is introduced by pipe 28 into the center of the upper section near the bottom of the cone. Sodium hydroxide solution is introduced by pipe 21 in like manner as described in reference to Fig. 1.

Solid basic calcium hypochlorite formed in the upper section is raked toward the middle and falls through down-pipe 25, where it is dispersed with liquor coming through pipe 30. Solids are again collected in the second section by the rake and likewise fall into the bottom section. In this lowest section the solids are dispersed with hypochlorite solution from the first chlorination and collected again by the rake. In the dispersion washing out of mother liquor is effected. The suspension of basic hypochlorite is taken off through pipe 32. The mother liquor flows off at the top into launder 31.

A light modification of the operation described in reference to Fig. 5 is to cause a portion only, such as a half, of the liquor from the first chlorination to be metered into the line carrying the filtrate from the solid bleach. The points of introduction remain the same as just described.

Although in each of the above examples or embodiments the process has been illustrated with reference to caustic soda, other alkali metal hydroxides could be used, but at present this is not commercially feasible.

I wish it understood that I do not limit myself to the details of the various apparatuses which I have described. Other modes of applying the principle of my invention may be employed instead of those explained. I do not intend to be limited except within the terminology of the appended claims.

I claim:

1. In the manufacture of high test bleach, the steps of reacting an ascending solution of calcium hypochlorite and calcium chloride with alkali metal hydroxide solution of greater density thereby forming solid basic calcium hypochlorite, permitting said solid basic calcium hypochlorite to settle down further through an additional quantity of unreacted ascending solution of calcium hypochlorite and calcium chloride to free it from the liquid phase resulting from the first mentioned reaction step, and withdrawing from the system said solid basic calcium hypochlorite as a slurry in some of the unreacted hypochlorite and chloride solution.

2. In the manufacture of high test bleach, the steps of reacting an ascending saturated solution of calcium hypochlorite and calcium chloride with caustic soda solution of greater density thereby forming solid basic calcium hypochlorite, permitting said solid basic calcium hypochlorite to settle down further through an additional quantity of unreacted ascending saturated solution of calcium hypochlorite and calcium chloride to free it from the liquid phase resulting from the first mentioned reaction step, and withdrawing from the system said solid basic calcium hypochlorite as a slurry in some of the unreacted hypochlorite and chloride solution.

3. In the manufacture of high test bleach, the steps of reacting in the upper portion of a reaction vessel an ascending solution of calcium hypochlorite and calcium chloride with caustic soda solution of greater density thereby forming solid basic calcium hypochlorite, permitting said solid basic calcium hypochlorite to settle down through the reacting solutions, intermittently impeding the downward movement of said solid basic calcium hypochlorite in said vessel, introducing at a lower point in said vessel a second quantity of solution of calcium hypochlorite and calcium chloride, and withdrawing said solid basic calcium hypochlorite as a suspension in part of said second solution from the bottom of said vessel.

4. In the manufacture of high test bleach, the steps of introducing a saturated solution of calcium hypochlorite and calcium chloride at separate levels in the lower portion of a reaction vessel, introducing caustic soda solution of greater density at the top of said vessel thereby forming solid basic calcium hypochlorite at the zone of admixture of such solutions, permitting said solid basic calcium hypochlorite to settle down through the ascending hypochlorite and chloride solution, impeding the settling and raking said solid basic calcium hypochlorite toward the center of said vessel at a point between the levels of introduction of said first-named solution, and withdrawing from the bottom of said vessel said solid basic calcium hypochlorite as a slurry with a portion of such solution introduced at the lowermost level.

5. In the process of making a suspension of solid basic calcium hypochlorite for use in the manufacture of high test bleach, the steps of reacting an ascending saturated solution of normal calcium hypochlorite and calcium chloride introduced into the bottom of a reaction chamber with caustic soda solution of greater density introduced into the top of said chamber, thereby causing the caustic soda solution to sink down into the ascending hypochlorite and chloride solution and reacting therewith to form solid basic calcium hypochlorite in the upper portion of said chamber, permitting said solid basic calcium hypochlorite to sink further through unreacted hypochlorite and chloride solution and thereby washing it free of reaction products soluble in said last-named solution, and withdrawing said solid basic calcium hypochlorite from the bottom of said chamber as a solid suspension in a liquid vehicle consisting of a portion of said hypochlorite and chloride solution.

RICHARD W. DARBYSHIRE.

REFERENCES CITED

The following references are of record in the file of this patent:

UNITED STATES PATENTS

| Number | Name | Date |
|---|---|---|
| 1,937,230 | Kitchen | Nov. 28, 1933 |
| 2,320,635 | Mericola et al. | June 1, 1943 |
| 1,713,654 | Guyer | May 21, 1929 |
| 1,434,089 | Christensen | Oct. 31, 1922 |

FOREIGN PATENTS

| Number | Country | Date |
|---|---|---|
| 357,798 | Great Britain | Oct. 1, 1931 |